April 20, 1926.

J. O. MAUBORGNE ET AL

WAVE METER

Original Filed August 6, 1920

Amplifier

Generator of undamped oscillations

Inventors
Joseph O. Mauborgne
Guy Hill

By Robert H. Young Attorney

Patented Apr. 20, 1926.

1,581,219

UNITED STATES PATENT OFFICE.

JOSEPH O. MAUBORGNE, OF CHICAGO, ILLINOIS, AND GUY HILL, OF WASHINGTON, DISTRICT OF COLUMBIA.

WAVE METER.

Original application filed August 6, 1920, Serial No. 401,746. Divided and this application filed February 3, 1923. Serial No. 616,748.

*To all whom it may concern:*

Be it known that JOSEPH O. MAUBORGNE and GUY HILL, citizens of the United States, residing at Chicago and Washington, in the county of Cook and State of Illinois and District of Columbia, have invented certain new and useful Improvements in Wave Meters, of which the following is a specification.

This is a divisional application of application relating to wavemeters No. 401,746. Our invention relates to the art of radio signaling having for its dominant object the use of a resonance wave coil as the essential element of a wavemeter. The resonance wave coil, which we will designate hereafter simply as "wave coil," functions as a complete oscillating system.

The object of the present invention is to provide a more simple and accurate means than those in present use for measuring the length of electric waves and also for transmitting from the wavemeter radio signals of definite known frequencies for the purpose of calibrating other wavemeters or radio receiving apparatus.

In its simplest form the wave coil is made in the form of a long helix, uniformly wound with suitable insulating wire closely spaced so that the inductance per unit length is relatively large.

We have found that it is desirable to wind the coil on a material having high insulating properties such as micarta, or bakelite-dielecto. We get, therefore, in a comparatively short coil, the equivalent condition of a long line in the matter of wave development.

In the use of the wavemeter described in this specification for the purpose of transmitting definite wave lengths or frequencies, we make use of a wave coil of distributed inductance and capacity on which a wave development is produced by the transmitting source of the wavemeter, the wavelength of the said wave development depending solely upon the electrical constants of the coil and the position of the potential application to said coil, the wave coil by itself constituting the complete oscillatory system. The electromagnetic waves of the outgoing signals are emitted from each element of the wave coil, and we have here a condition where the electrical constants of the coil, the inductance, capacity, resistance and E. M. F. set up therein by excitation from a suitable source of energy are all of a distributed character and the energy is radiated from each element of the coil, making it accordingly an ideal radiating system.

Similarly, using our invention as a receiving device for the purpose of measuring the wavelength of a received radio signal, a similar or the same wave coil is employed having distributed inductance and capacity of such magnitude as to insure wave development along the coil for the frequencies of the signals we desire to receive and measure.

The electro-magnetic waves of the incoming signals act uniformly on each element of the wave coil and we accordingly have a condition where the inductance, capacity, resistance of the coil, and the E. M. F. induced in it by the incoming signals are all of a distributed character making it in a sense an ideal wave conductor.

As a source of exciting our wavemeter for the purpose of transmitting signals of a definite frequency, we may make use of any of the methods described in our pending application Serial No. 389,450 covering the use of the wave coil as a transmitter. Likewise in using our wavemeter for the measurement of received signals we can make use of the various methods of using the wave coil as a receiver, as described in our pending application, Serial No. 383,720.

As stated above, the fundamental principles underlying the use of the wave coil for the measurement of transmitted and received signals have been described at considerable length in our two pending applications referred to above and therefore further explanation of these principles is considered unnecessary herein.

One of the main advantages that we claim for a wavemeter of the character herein described consists in the fact that the apparatus for measuring or determining the wavelength consists of a single element, which is a coil preferably in the form of a solenoid, as previously described, and which does not constitute a closed circuit. By the use of such a wave coil no condenser is required. With most existing forms of wavemeters which are capable of transmitting signals of a definite wavelength and with most forms of wavemeters which are used for measuring wavelengths of received signals, the accuracy of the wavemeter depends to a large degree upon the accuracy of the calibration of the variable or fixed condensers used in such wavemeters. If a fixed condenser be used in a wavemeter, a variable inductance has to be employed which also is subject to lack of permanency, thereby destroying the value of the wavemeter for accurate measurements. In our device as described herein only one element, that is, the wave coil itself, is used to determine wavelength, and therefore, if this coil be accurately constructed, there is only one element that has to be kept in accurate adjustment and thereby the accuracy of the wavemeter is greatly increased.

In addition, as stated above, this wave coil is in no way altered or the inductance or other constants of the wave coil varied in order to measure or generate different wave lengths; in other words, we do not find it necessary to change the effective length of the coil. In addition to the facts stated above, it is evident that increased accuracy can be obtained because in using the wave coil for different wavelengths no change whatsoever is made in the wave coil itself, and no part of the wave coil has to be altered, moved, or adjusted in any manner, the entire change of wavelength being made by means of moving a suitable slider or sliders associated either electrostatically or electro-magnetically or by direct connection with the wave coil.

In the use of the wave coil as a wavemeter, suitable calibration scales are associated with the coil in order that wavelengths may be read directly from said coil, or from a suitable scale of equal parts placed thereon with reference to a set of curves furnished with the instrument.

In connection with the use of the wave coil as a wavemeter we may associate it as a detecting instrument, any form of a detector and receiver known to the art. In its simplest form we may take a crystal detector and shunt it with a pair of high resistance telephone receivers connecting one side of the detector by a suitable single lead to the slider on the wave coil. To use the wave coil as a transmitting wavemeter, we may employ a suitable buzzer, actuated by a battery and connected to one side of the make and break of the buzzer by a single lead to said slider on said wave coil.

The use of our device as a wavemeter also has one advantage over the ordinary type of wavemeter because by employing a suitable amplifier in connection with the wave coil, accurate calibration of distant transmitting stations can be determined. Since the action of the wave coil for determining the length of received signals depends entirely upon the position of a single slider on the coil to which a single lead is attached, any desired degree of amplification can be employed without effecting the calibration of the instrument in the slightest degree.

As stated above, in the use of this wave coil as a transmitting wavemeter, the length of the wave set up on the coil depends upon the position of application of potential to the coil. By charging the point of application of the energy source to different positions along the coil, moving the slider on the coil always in the same direction from the center, different wavelengths are set up on the coil for each position of the application point and these are entirely independent of the construction or constants of the lead and the associated circuits devised for supplying energy to the coil. When the energy is impressed on the center of the wave coil, the shortest wavelength is obtained. As the slider or point of potential application is moved away from the center in either direction towards the ends of the coil, the wavelength generated is increased. The maximum wavelength is produced when the energy application point is near either end of the coil.

An identical calibration applies when the wave coil is used to measure received signals. In the specifications as given above, and in the figures shown in this application, the wave coils are shown as coils uniformly wound in the form of a long helix. It is to be understood, however, that the invention is in no way limited to the use of a wave coil of this simple construction. If desired, in order to get an extremely long wavelength or a great range of wavelengths in a given space, multiple layer coils may be employed. In addition, the winding of the coil may be banked on one half, or closely wound in the form of a lump on one half and distributed or wound with wider spacing on the other half of the helix in order to obtain a very accurate measurement of a shorter range of wavelengths over a comparatively long space of coil.

Numerous other variations are evident, but it is considered unnecessary to describe them as it is considered that they are all merely modifications of the principle of our invention which is to accurately determine wavelengths by the use of a single calibrated coil used with associated apparatus which does not require calibration. By the use of our device, however, it is never necessary, in fact it is undesirable, to connect the wave coil to the antenna system or associated apparatus by any means whatsoever or any transmitter or receiver, the frequency or wavelength of which is to be determined. Neither is it necessary to connect said wave coil to earth for the purpose of any measurements.

The principle of operation and the method of using our invention can better be understood by reference to the accompanying diagrammatic figures which show typical embodiments of the invention and form part of this specification. In all of the figures herewith the same symbols and nomenclature are used to designate the same apparatus and further reference to various common symbols will not be repeated except in cases where it is necessary to make clear the differences between the various figures.

In the accompanying drawings, Figure 1 is is a diagrammatic view of the simplest form of the device as a practical wavemeter, embodying both the transmitting and receiving features;

Figure 6:
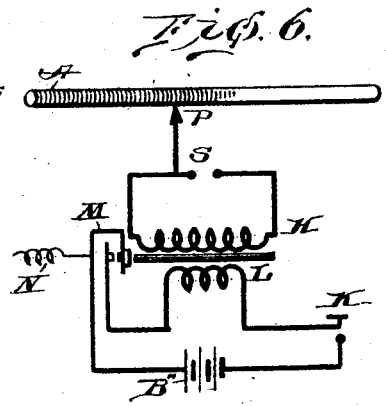

Figure 6 likewise shows in diagrammatic form another modification of the wave meter used as a transmitter.

Figure 1:
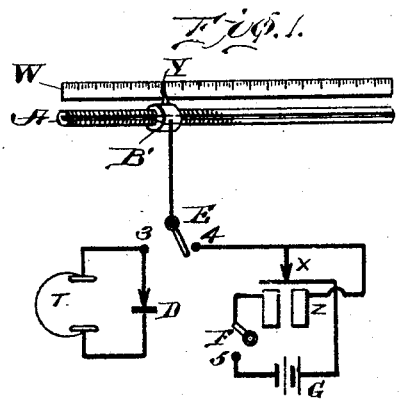

Having more particular reference to the drawings and to Figure 1, A represents the wave coil consisting of a helix of suitably insulated wire, preferably copper, closely wound in a single layer on an insulating tube. We prefer to make the length of the helix greater than its diameter. B' indicates the slider making direct contact with the wave coil and capable of being moved along the wave coil. B' is provided with a pointer Y which moves over a graduated scale W, showing directly the calibration on the coil in wavelengths or frequencies. E represents the switch connected to B' by a single lead. This switch, as shown in the figure, can either connect B' to the receiving apparatus or to the transmitting apparatus of the wavemeter. When this switch is thrown to contact 3, the wavemeter is adapted for the measurement of received signals. Contact 3 is connected to one side of a crystal detector D, to the terminals of which detector are connected a pair of telephone receivers T. When the switch E is thrown on contact 4, the wave meter can be used to transmit waves of predetermined length. Contact 4 is connected to X, one side of the make and break of the buzzer Z as shown in the figure. The buzzer operates when the switch F is closed on contact 5 thereby completing the circuit of battery G, through the coils of the buzzer.

In the succeeding figures certain modifications of the wavemeter as a transmitter and as a receiver are shown The scale W and pointer Y are not repeated in the succeeding diagrams.

Figure 2:
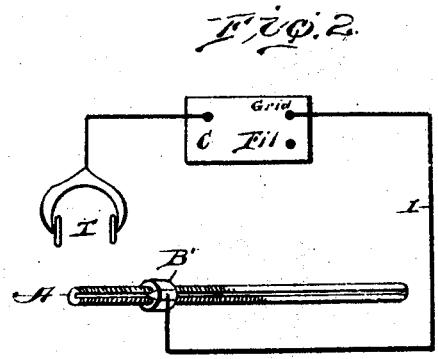
Figure 2 shows a diagrammatic view of the wavemeter as the receiver, only, in which the vacuum tube detector or vacuum tube detector and amplifier are employed, as the detecting element.
Figure 3:
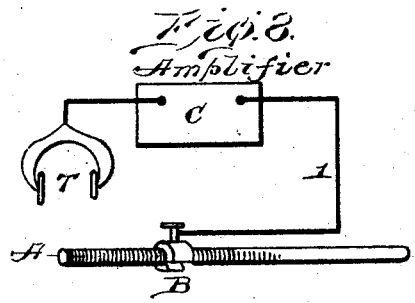
Figure 3 is similar to Figure 2 except that a different type of slider is used on the wave coil.

Figure 2 shows a modification of our wavemeter when used for the measurement of received signals at a considerable distance from the transmitter. By using suitable amplifier C, the connection shown in this figure enables the direct measurement of received signals to be obtained at a great distance from the transmitter. This Figure 2 is identical with Figure 6 of our application Serial Number 383,720. In this figure A and B' represent the coil and slider respectively similar to those shown in Figure 1. In this case the lead from the slider to the receiving device is indicated by the numeral 1. The lead, in the case of a vacuum tube detector, is always brought to the grid input terminal of the detector, or in the case of a multiple stage amplifier, to the input terminal of the first stage of the amplifier. Telephone receivers T in this diagram are plugged in at a suitable point in the circuit of the amplifier or detector C. The operation of the wavemeter when employing connections as shown in Figure 2 is identical with the use of the wavemeter as a receiver, as described in our patent application Serial Number 383,720. In other words, the device referred to in our patent application Serial Number 383,720 just mentioned already constitutes a wavemeter Figure 3 shows a diagrammatic view similar to Figure 2 in all respects except that slider B makes electro-static connection with wave coil A instead of the direct connection made by slider B' in Figure 2. This slider B' may take any desired form such as an open or closed cylinder or an open or closed disc of metal. Figure 3 is identical with Figure 1 of our patent application Serial Number 383,720.

Figure 4:
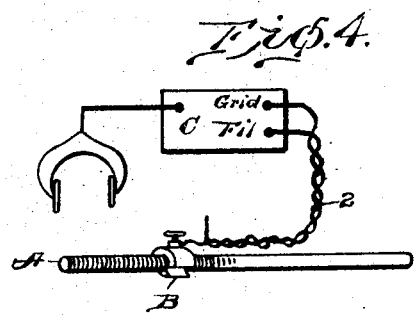
Figure 4 is similar to Figure 3 except that there is introduced a neutralizing lead.

Figure 4 is a diagrammatic view similar to Figure 3 except that a neutralizing lead indicated on the figure by "2" is twisted with lead 1 of Figure 3 so as to produce a twisted pair. One end of the neutralizing lead is attached to the filament, but the other end is left disconnected as shown in the drawing. The advantage of using the twisted pair of leads is that any radio energy which might be picked up by the lead from the slider to the grid input terminal of the amplifier is neutralized by an equal amount of energy received by the filament lead. Hence no signal is produced in amplifier C due to the energy received by the leads. Under certain conditions this connection is of considerable advantage. Figure 4 of this specification is identical with Figure 2 of our patent application Serial Number 383,720.

Figure 5:
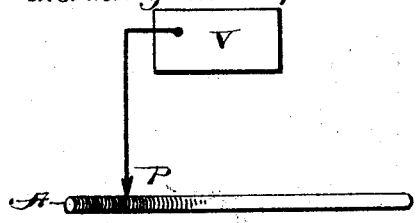
Figure 5 shows a modification as to the transmitting side of the wavemeter of the device when used for generating different wavelengths.

Figure 5 is a diagrammatic view showing a modification of the transmitting arrangement shown in Figure 1. A represents the wave coil to which at point P is connected, by any one of the methods described, a lead from a suitable source of undamped wave potential V, so designed as to produce at P on coil A a high potential. This figure is identical with figure 3 of our pending application Serial Number 389,450, describing the use of a wave coil as a transmitter.

Figure 6 is a diagrammatic view showing another modification of the use of the wave coil as a transmitter. This figure is similar to Figure 1 except that in place of utilizing a buzzer as a source of high potential to actuate the wave coil A, a simple induction coil with a spark gap across its secondary terminals is employed. This figure is similar to Figure 1 of our pending application Serial Number 389,450 describing the use of the wave coil as a transmitter, except that the interrupter of the induction coil is shown in slightly different form.

While we have referred in this specification particularly to the use of our device for the purpose of measuring or generating radio frequencies, it is to be understood that the words "radio frequencies" are intended to cover frequencies of approximately 5000 or above whether employed for radio signaling or for any other purpose and where it might be desired to determine or measure the wave lengths of the frequencies employed.

It is also obvious, as we have stated above, that various changes and modifications may be made in the wave coil and its associated apparatus herein shown and described without departing from the spirit of our invention or the scope of the following claim.

Claim:

In an apparatus for producing electromagnetic energy of predetermined wave length, the combination of an open circuit and ungrounded resonance wave coil having fixed distributed inductance and capacity and being capable of having developed thereon standing waves of a wide variety of frequencies, the frequency of the energy in the wave coil being determined solely by the electrical constants of the coil and the point of application of a high potential from a local untuned energy source, means for varying the point of application to said coil of said high potential, means for electrically connecting said point of application to said high frequency sources and calibrating said wave coil so that the point of application of the high frequency source will determine the frequency of the electromagnetic energy in the wave coil, and local means for producing said untuned high frequency potential.

In testimony whereof we affix our signatures.

JOSEPH O. MAUBORGNE.
GUY HILL.